US007259945B2

(12) United States Patent
Cleveland

(10) Patent No.: US 7,259,945 B2
(45) **Date of Patent: *Aug. 21, 2007**

(54) ACTIVE ARC-SUPPRESSION CIRCUIT, SYSTEM, AND METHOD OF USE

(75) Inventor: Andrew J. Cleveland, Reno, NV (US)

(73) Assignee: Server Technology, Inc., Reno, NV (US)

(*) Notice: Subject to any disclaimer, the term of this patent is extended or adjusted under 35 U.S.C. 154(b) by 498 days.

This patent is subject to a terminal disclaimer.

(21) Appl. No.: 10/734,910

(22) Filed: Dec. 12, 2003

(65) Prior Publication Data

US 2004/0179313 A1 Sep. 16, 2004

Related U.S. Application Data

(63) Continuation-in-part of application No. 09/689,157, filed on Oct. 12, 2000, now Pat. No. 6,741,435.

(60) Provisional application No. 60/224,387, filed on Aug. 9, 2000.

(51) Int. Cl.
*H02H 3/00* (2006.01)

(52) U.S. Cl. .......... 361/2

(58) Field of Classification Search .......... 361/2–13
See application file for complete search history.

(56) References Cited

U.S. PATENT DOCUMENTS 3,558,910 A * 1/1971 Dale et al. .......... 307/134
4,356,525 A * 10/1982 Kornrumpf et al. .......... 361/4
4,745,511 A * 5/1988 Kugelman et al. .......... 361/8
4,811,163 A 3/1989 Fletcher et al.
4,959,746 A * 9/1990 Hongel .......... 361/13
5,739,594 A 4/1998 Sheppard et al.
6,051,893 A 4/2000 Yamamoto et al.
6,172,432 B1 1/2001 Schnackenberg et al.
6,741,435 B1 * 5/2004 Cleveland .......... 361/2
2002/0084697 A1 7/2002 Radusewicz et al.
2002/0117900 A1 8/2002 Perttu
2002/0130556 A1 9/2002 Hohri
2003/0194920 A1 10/2003 Foch et al.
2004/0076148 A1 4/2004 Ferry et al.
2004/0084966 A1 5/2004 Yarbrough

* cited by examiner

*Primary Examiner*—Stephen W. Jackson
(74) *Attorney, Agent, or Firm*—Klarquist Sparkman LLP

(57) ABSTRACT

An active arc suppression circuit and systems and methods of use to suppress arcing in an electro-mechanical apparatus. The preferred circuit includes an electro-mechanical switch and a solid state shunt switch for temporarily shunting current around the electro-mechanical switch for a predetermined period of time. The preferred circuit also includes an electro-mechanical switch controller for delaying the activation of the electro-mechanical switch until after the predetermined period of time for shunting current through the solid state shunt switch has commenced. The preferred circuit may be used with power control equipment and systems, including in remotely controllable systems for telecommunications, computing, and other networks. In a particularly preferred embodiment, multiple such circuits may be disposed in a power controller housing to provide independent active arc suppression control of multiple power outputs also disposed in the power controller housing.

35 Claims, 3 Drawing Sheets

ACTIVE ARC-SUPPRESSION CIRCUIT, SYSTEM, AND METHOD OF USE

CROSS-REFERENCE TO RELATED APPLICATIONS

The present application is a continuation-in-part of, and hereby incorporates by reference, the applicant's U.S. patent application Ser. No. 09/689,157, filed Oct. 12, 2000, now U.S. Pat. No. 6,741,435 entitled POWER CONTROLLER WITH DC-SUPPRESSION RELAYS, which claims priority through the applicant's Provisional U.S. Patent Application Ser. No. 60/224,387, filed Aug. 9, 2000, with the same title.

FIELD OF THE INVENTION

The present invention relates to an active arc-suppression relay. More particularly, the present inventions relates to an active arc-suppression relay having a active power shunt circuit to shunt current around another power relay, most preferably in response to a control command received over a network.

BACKGROUND

There is a growing need for competitive local exchange carriers to manage remote power control functions of internetworking devices at telephone company (telco) central offices. Competitive local exchange carriers (CLECs), incumbent local exchange carriers (ILECs), independent telephone companies, and other next generation service providers are now all offering a digital subscriber line (DSL) service that promises high-speed Internet access for both homes and businesses. DSL is expected to replace integrated services digital network (ISDN) equipment and lines, and DSL competes very well with the T1 line that has historically been provided by ILECs. A DSL drop costs about $40-60 per month, and is expected to quickly become the dominant subscriber-line technology.

The DSL service is provided by a switch that is co-located in a telco central office, that is, a digital subscriber line access multiplexer (DSLAM). Many new competitive local exchange carriers are now deploying DSL service in several states. They are installing digital subscriber line access multiplexers in many locations. Such digital subscriber line access multiplexers are now available from a number of different manufacturers, for example, Paradyne, Copper Mountain, Ascend, etc.

Nearly all such digital subscriber line access multiplexers are powered by 48-VDC battery power and all have operator console ports. And for emergencies, these DSLAMs usually have two independent 48-VDC battery power supplies, for example, an A-channel and a B-channel. Most commercial DSLAMs are also controlled by large operating systems that host various application software. Unfortunately, this means most DSLAMs have the potential to fail or lock-up, for example, due to some software bug.

When a digital subscriber line access multiplexer does lock-up, the time-honored method of recovering is to cycle the power, that is, reboot. But when a digital subscriber line access multiplexer is located at a telco central office, such location practically prevents it being easy to reboot manually.

There are many large router and ATM switch farms around the country that are equipped by the leading vendors, for example, Cisco, Bay Networks/Nortel, Ascend, Lucent, Fore, etc. So each of these too has the potential to lock-up and need rebooting, and each of these is very inconvenient to staff or visit for a manual reboot when needed.

Server Technology, Inc., of Reno, Nev., markets a 48-VDC remote power manager and intelligent power distribution unit that provides for remote rebooting of remote digital subscriber line access multiplexers and other network equipment in telco central offices and router farms. The SENTRY 48-VDC is a network management center that eliminates the dispatching of field service technicians to cycle power and rectify locked-up digital subscriber line access multiplexers.

Statistics show that seventy percent or more of all network equipment lock-ups can be overcome by rebooting, for example, cycling power off and on. A remote power controller, like the SENTRY, can reduce network outages from hours to minutes.

In a typical installation, the telco central office provides the competitive local exchange carriers with bare rack space and a 48-VDC power feed cable that can supply 60-100 amps. The single power input is conventionally distributed through a fuse panel to several digital subscriber line access multiplexers in a RETMA-type equipment rack. Individual fuses in such fuse panel are used to protect each DSLAM from power faults.

But such fuses frequently weld themselves to their sockets in the fuse panel due to loose contacts and high amperage currents. It is ironic therefore that many digital subscriber line access multiplexers do not have power on/off switches. Thus the fuse often must be pried out and put back in or replaced so the DSLAM can be powered-off for rebooting. But when the fuse is welded, removing the fuse without damaging the fuse panel can be nearly impossible.

The Server Technology SENTRY 48-VDC accepts from the telco or other site host an A-power feed cable and B-power feed cable. Internally, DC-power is distributed to a set of "A" and "B" rear apron output terminal blocks that are protected by push-to-reset circuit breakers. The fuse panel is no longer required. The A-feed and B-feed are then matched to the newer digital subscriber line access multiplexers that also require A-power supply and B-power supply inputs.

Sometimes digital signaling lines can lose the carrier. In such cases, the respective DSLAM must be rebooted to restore the DS3 line. A technician is conventionally required to visit the DSLAM, and use a console port to monitor how the software reboots, and if communications are correctly restored to the DS3.

A SENTRY 48-VDC can be used to remotely power-off the digital subscriber line access multiplexer in the event the carrier is lost. A companion asynchronous communications switch can be used to establish a connection to the DSLAM's console port. Power can be cycled to the DSLAM, and the asynchronous communications switch used to monitor the reboot operation to make certain that the carrier to the DS3 line is restored. The asynchronous communications switch is a low-cost alternative to the expensive terminal server typically used for console port access. The reboot process and the console port monitoring process can both be managed from an operations center, without the need to dispatch technical personnel to the remote location.

The floor space that a competitive local exchange carrier's equipment rack sits upon is very expensive, so the equipment placed in the vertical space in a rack ("U-space") must be as compact as possible. A typical rack may house several digital subscriber line access multiplexers, a terminal server, a fuse panel, and 48-VDC modems. A SENTRY 48-VDC uses "2 U or 3 U" (3.5 or 5.25 inches) of vertical RETMA-rack space, and combines the functions of a fuse panel, a terminal server, and a modem. As many as sixteen 10-amp devices, eight 20 amp devices, or four 35-amp devices can be supported.

Power controllers, like the Server Technology SENTRY, have long used electro-mechanical relays to open and close the 48-volt supply lines to the network equipment. Unfortunately, the same physical phenomena that welds the fuses in their holders can also weld or destroy the contacts of these relays.

Most electric welders generate the high heats necessary to fuse metal together by arcing a direct current (DC) low voltage (under 50-volts) and high current (over 50-amps) across an electrode gap. Such conditions occur in a power controller's relay, especially when the relay contacts are opening. The mass inertia of the contact mechanism has to be overcome before the contacts can open. The contacts accelerate apart, but are moving only very slowly at the start. Electric arcs, once generated, will continue even though the electrode separation distance is increased. This is the so-called Jacob's Ladder effect. The ionized air and the heated contacts increase the distance an arc can bridge. The arcing stops only after the contacts are very wide apart.

In contrast, a pair of open relay contacts will not arc until the contacts get very close to one another. By this time, the contact closure is moving at its near maximum velocity. So the remaining gap that needs to be closed up when the arc commences will vanish quickly.

One prominent prior art arc suppression circuit consists of a capacitor in series with a resistor and a diode in parallel interconnecting the input and the output of the electro-mechanical relay. This type of conventional circuit shunts some electricity around the electro-mechanical relay when it is activated, reducing the extent of arcing that might otherwise take place. This conventional circuit is, however, relatively slow acting circuit (in passive response to the activation of the electro-mechanical relay to open or stop the flow of current from, for example, the input to the output) and does not completely eliminate all arcing between separating contacts in an electro-mechanical relay. Over an extended period of activation of this type of electro-mechanical relay circuit with passive arc suppression, electro-mechanical relay contacts often burn up and fail.

BRIEF SUMMARY OF THE PRESENT INVENTION

The present invention provides one or more active arc-suppression circuits and systems and methods of use such circuits. In the preferred embodiment, at least one of the active arc-suppression circuits includes an active shunt switch in conjunction with an electro-mechanical power relay. Most preferably, the active arc-suppression circuit is included in a direct current power controller system in network communication with a separate power manager system to control direct current power to computing systems, communications equipment, or other electrical equipment.

In a particularly preferred embodiment, an active direct current arc-suppressor circuit for network appliance power managers comprises an active solid state power shunt relay in conjunction with an electro-mechanical relay to control the flow of battery current to a network appliance by remote control. The preferred electro-mechanical relay includes electrical contacts that open to interrupt the flow of current in response to an off-command signal. The preferred active solid state power shunt relay is connected in shunt across the relay contacts to temporarily divert such flow of current from the electro-mechanical relay. A timing circuit preferably is connected to respond to an off-command signal by first turning on the shunt solid state switch, then opening the relay contacts, and then turning off the shunt solid state switch. The shunt solid state switch is sized to carry the full rated peak current of the relay contacts, but preferably only for the few milliseconds that are needed to allow the relay contacts to fully separate.

The present invention can preferably provide an electro-mechanical power controller or switch with more reliable relay operation. Most preferably, the electro-mechanical power controller or switch also is relatively economical and longer lasting than conventional electro-mechanical power controllers or switches.

The present active arc suppression invention may be used in other environments as well, in order to suppress arcing across electro-mechanical components in circuitry.

These features and many other objects and advantages of the present invention will become apparent to those of ordinary skill in the art after having read the following detailed description of the preferred embodiments which are illustrated in the various drawing figures. It is to be understood, however, that the scope of the present invention is to be determined not by whether a given embodiment meets all objects or advantages set forth herein but rather by the scope of the claims as issued.

DESCRIPTION OF THE DRAWINGS

The preferred embodiments are shown in the accompanying drawings wherein.

DETAILED DESCRIPTION OF THE PREFERRED EMBODIMENTS

Figure 1:
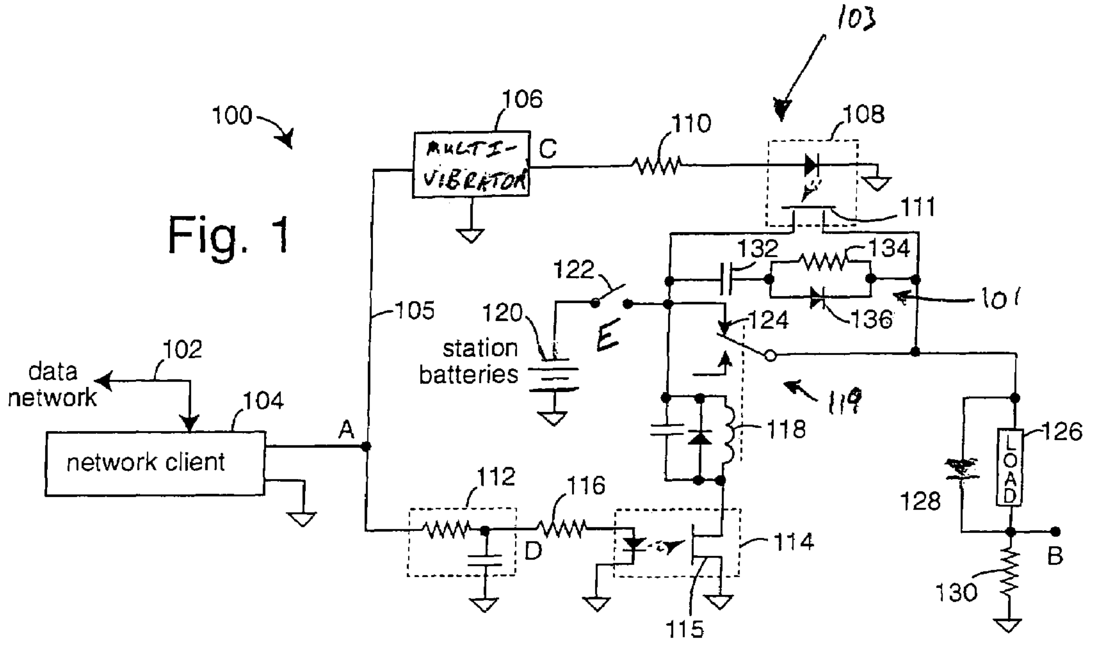
FIG. 1 is schematic circuit diagram of one power controller embodiment of the present invention that includes a conventional DC arc-suppression circuit along with an active solid state shunting switch and circuit.

FIG. 1 illustrates a power controller embodiment of the present invention, referred to herein by the general reference numeral 100, including both conventional passive 101 and active 103 arc suppression circuitry. The power controller 100 connects to a computer data network 102, for example, the Internet, and can send status and receive commands with a network client 104. A power-OFF command raises a signal line 105 and triggers a mono-stable multivibrator 106. A twenty millisecond long pulse is fed to an opto-isolated solid state switch or photo relay 108 through a dropping resistor 110. This turns-on a power metal-oxide-semiconductor field-effect transistor (MOSFET) 111 for the period of the twenty millisecond long pulse from the mono-stable multivibrator 106.

The raising of signal line 105 by the power-OFF command also is fed through a two-millisecond capacitor-drain delay circuit 112 and is forwarded to another opto-isolated solid state switch 114 through a dropping resistor 116. This turns on a MOSFET transistor 115, which in turn energizes an inductive armature 118 in an electro-mechanical relay 119.

A set of station batteries 120, for example, a 48-volt bank at a Telco Central Office, are connected through a master switch 122 and a pair of normally closed relay contacts 124 to a load 126. Network routers, bridges, and other computer network equipment are examples of what is represented by load 126. A suppression diode 128 helps control transients that occur across the load during the operation of the relay contacts 124. A sense resistor 130 is useful for the monitoring of load currents with a voltmeter or oscilloscope (not shown).

The conventional arc-suppression circuit 101 is somewhat redundant and comprises a capacitor 132 in series with a parallel resistor 134 and diode 136, which collectively are connected across the relay contacts 124 to provide additional reduction of arcing and contact 124 burning, particularly in the case of any failure of the active arc suppression circuit 103. Alternatively, the conventional arc suppression circuit 101 may be omitted, which reduces cost and bulk of the arc suppression circuitry overall.

Figure 2:
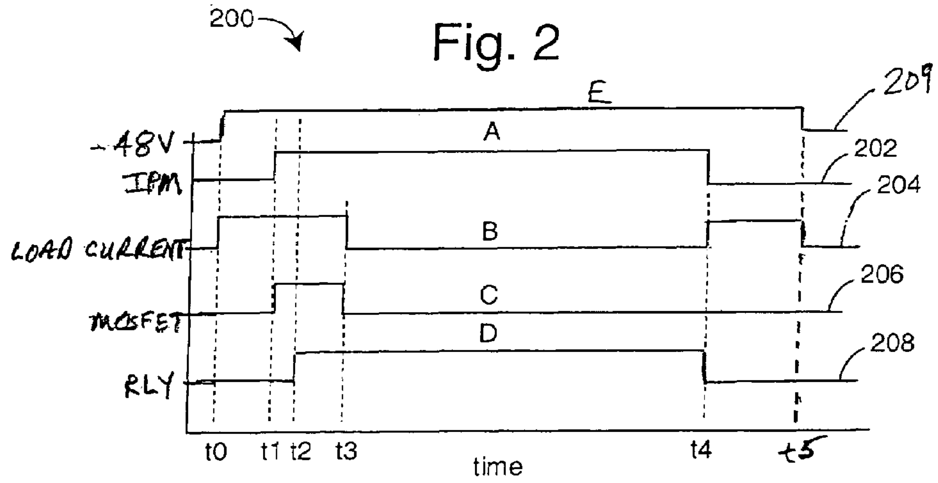
FIG. 2 is a timing diagram showing various signal points within the preferred embodiment of FIG. 1.

FIG. 2 schematically illustrates some of the signal timing that occurs in the power controller 100 of FIG. 1 during operation. In this context, signal-A 202 corresponds to the output of the network client 104, for example, signal line 105. Signal-B 204 corresponds to the load current, as seen as a voltage across sense resistor 130. Signal-C 206 corresponds to the output of the mono-stable multivibrator 106. Signal-D 208 corresponds to the output of the delay circuit 112 as seen by the dropping resistor 116. Signal-E 209 corresponds to the output of the station batteries through the master switch 122. (See also FIG. 4 and associated text infra.)

With reference back to FIGS. 1 and 2, during operation, at a time t0 the power controller 100 is energized and master switch 122 is closed to provide power from the station batteries 120 to the electro-mechanical relay 119 and the passive 101 and active 103 arc suppression circuits. At a time t1, the network client 104 receives a power-OFF command, and signal-A 202 is raised on signal line 105. This triggers the mono-stable multivibrator 106 and causes a twenty millisecond pulse output to appear as signal-C 206. This turns-on the MOSFET 111 for the twenty millisecond period of the pulse output at signal-C 206. The signal-A 202 being raised also causes signal-D 208 to be asserted, but with a two millisecond delay brought about by the capacitor-based delay circuit 112. This energizes electro-mechanical relay 118 and pulls open contacts 124 within the electro-mechanical relay 118. The delay of two-milliseconds is represented by the slope of signal-D between times t1 and t2. The solid state shunt switch (MOSFET) 111 turns off at time t3, having done its job of shunting the load current while the relay contacts were breaking or opening. Signal-B 204 therefore automatically falls back to zero at time t3, at which time output current is off.

At time t4, the network client 104 receives a power-ON command, and signal-A 202 is lowered. This causes signal-D 208 to drop and the relay contacts 124 close at time t4. The mono-stable multivibrator 106 is unaffected because it is positive-edge triggered only. At time t5, the master switch 122 is opened, which causes signal-E and signal-B (output) to drop to zero.

The mono-stable multivibrator 106 can be implemented with a National Semiconductor NE555. The opto-isolated solid state switches 108, 144 can be implemented with an MSD-W6225DDX, by MagnaCraft, Inc.

Figure 3:
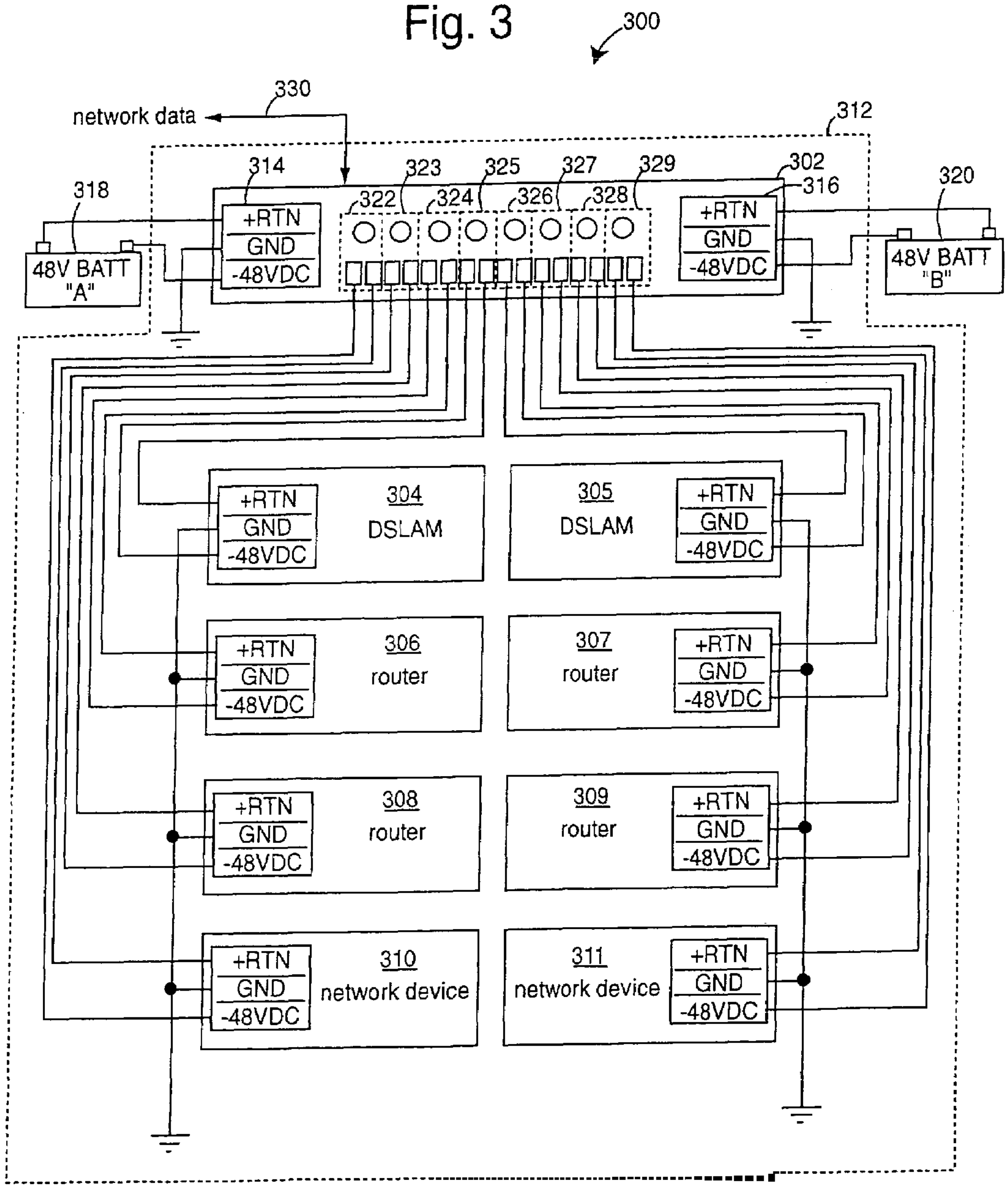
FIG. 3 is a functional block diagram showing a preferred dual-source battery power manager wired to power-cycle DSLAM, routers, and other network devices.

FIG. 3 represents a system 300 that includes a dual 100-amp battery source power manager 302 wired to power-cycle two DSLAMs 304, 305 four routers 306, 307, 308, 309 and two generic network devices 310, 311.

The chassis are all mounted in a single RETMA-rack or housing 312. An A-channel power connector 314 and a B-channel power connector 316 on the power manager 302 receive two circuits of 48-volt DC battery power from a telco site. A pair of batteries 318 and 320 represents these sources. A plurality of power control modules 322-329 internal to the power manager 302 are independently controlled from a network connection 330 and can individually control A-channel and B-channel DC-power supplied to each DSLAM 304, 305, routers 306, 307, 308, 309, and generic network devices 310, 311. The power control modules 322-329 include the DC arc-suppression circuitry of FIG. 1 or alternatively of FIG. 4.

When any of the DSLAMs 304, 305, routers 306, 307, 308, 309, and generic network devices 310, 311 need to be remotely rebooted, an appropriate network data is sent to the responsible power control modules 322-329 to cause both A-channel and B-channel DC power to cycle off and on.

Figure 4:
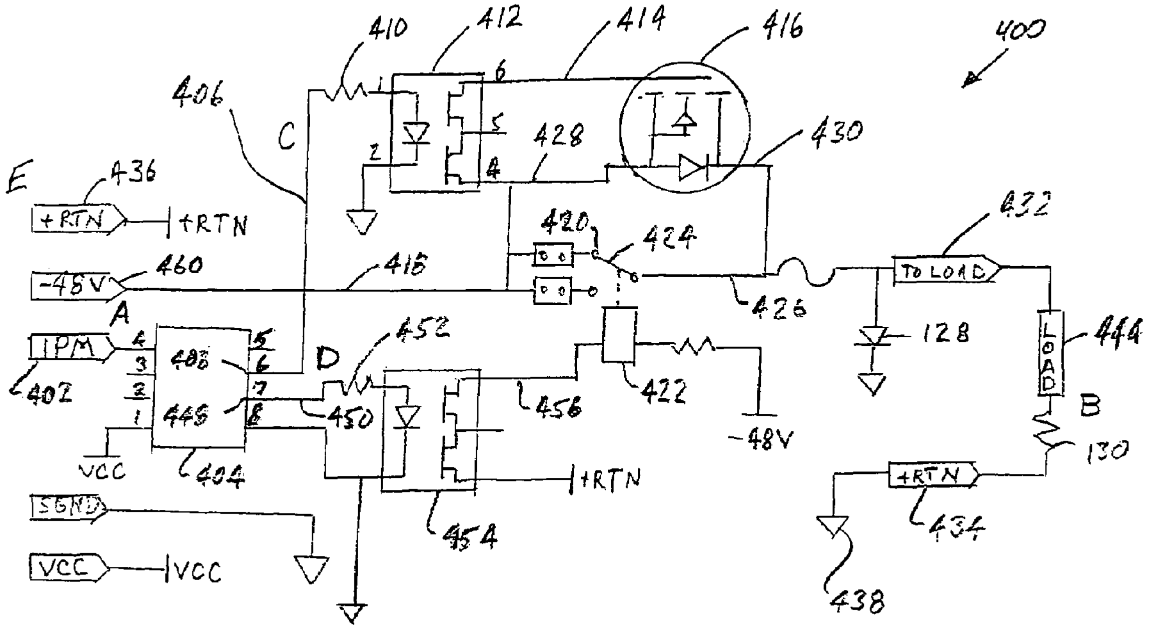
FIG. 4 is a schematic circuit diagram of a second preferred power controller embodiment of the present invention, utilizing a microprocessor to control timing of activation of solid state switches (transistors) including an active solid state shunting switch and circuit.

With reference now to FIG. 4, an alternative DC-arc suppression circuit, generally 400, receives IPM input 402 from an intelligent power module (not shown), which includes the network client 104 of FIG. 1. The IPM input 402 is received by a microcontroller 404 loaded with micro-code to provide the timing functionality of the mono-stable multivibrator 106 and the capacitor-based delay circuit 112 of FIG. 1. A shunt signal output 408 from microcontroller 404 is connected through shunt signal line 406 to a first current limiting resistor 410 and then to a solid state shunt signal switch 412. In turn, solid state shunt signal switch 412 is connected by shunt power switch line 414 to a solid state shunt power switch 416.

A −48 volt power source 460 is connected through relay current input line 418 and is connected to the current input contact 420 in an electro-mechanical relay, generally 422. The electro-mechanical relay 422 includes an inductive armature (not shown), which is connected to controllably activate contact arm 424 to move contact arm from a closed position in contact with the current input contact 420 to an open position distal from the current input contact 420. Contact arm 424 is connected to a −48 volt relay current output line 426.

The solid state shunt signal switch 412 has a shunt switch power input 428 connected to the −48 volt relay current input line 418 and a shunt switch power output 430 connected to the −48 volt relay current output line 426. When turned on by solid state shunt signal switch 412, the solid state shunt power switch 416 shunts available current from the −48 volt relay input line 418 to the −48 volt relay current output line 426.

The −48 volt relay current output line 426 is connected to a load output connector 432, which in turn is connected to a load 444. A positive return connector 434 also is connected to the load 444 and to the positive return line 436 in the DC-arc suppression circuit 400.

An electro-mechanical relay signal output 448 from microcontroller 404 is connected through relay signal line 450 through a second current limiting resistor 452 to a relay control solid state switch 454. In turn, the relay control output line 456 of the relay control solid state switch 454 is connected to the electro-mechanical relay 422. When relay control solid state switch 454 is turned on by electro-mechanical relay signal output 448, the electro-mechanical relay 422 is activated to move contact arm 424 distal from current input contact 420.

With reference now to FIGS. 2 and 4, the timing of the microcontroller-based power controller of FIG. 4 commences with power controller energized to provide current to load 444. At this time t0: (i) the station batteries or other −48 volt power supply (not shown in FIG. 4) are switched "on" to supply power, signal-E, through the −48 volt connector 460 and its mating + return connector 436; and (ii) the microcontroller 404 has already signaled relay control solid state switch 454 through relay signal line 450 to turn "on," so that the contact arm 424 is in contact with current input contact 420. This causes load output current signal-B to flow, also reflected as voltage across sense resistor 130.

At time t1, the IPM (not shown) issues a power-OFF command by raising signal-A on the IPM input 402 to the microcontroller 404. In turn, the microcontroller raises signal-C on shunt signal line 406, causing the solid state shunt signal switch 412 to turn on the solid state power shunt switch 416. The solid state power shunt switch 412 thus provides a current shunt from the −48 volt relay current input line 418 to the −48 volt relay current output line 426.

At time t2(two milliseconds after time t1), the microcontroller 404 raises signal-D on the relay signal line 450, which causes relay control solid state switch 454 to turn on and in turn activate an inductive armature (not shown in FIG. 4) in the electro-mechanical relay 422 to move the contact arm 424 to an open position distal from the current input contact 420 so that current cannot jump (arc across) the gap between the contact arm 424 and the current input contact 420.

At time t3(twenty milliseconds after time t1), the microcontroller lowers signal-C, causing the solid state power shunt relay 416 to turn off and terminate the flow of current from the shunt switch power input 428 to the shunt switch power output 430. Since there then remains no path for current flow from the −48 volt relay input line 418 to the −48 volt relay current output line 426, output current signal-B drops to zero (turns off).

At time t4, the IPM (not shown) issues a power-ON command by lowering signal-A on the IMP input 402 to the microcontroller. In turn, the microcontroller 404 lowers signal-D, causing the electro-mechanical relay 422 to move the contact arm 424 into contact with the current input contact 420. Since there is now a path for current flow from the −48 volt relay input line 418 to the −48 volt relay current output line 426, output current signal-B raises (turns on).

At time t5, the station batteries or other −48 volt power supply (not shown in FIG. 4) stops supplying power, signal-E, through the −48 volt connector 460 and it's mating + return connector 436. As a result, signal-B, current through load 444 and voltage as measured at sense resistor 130 also drop to zero.

In the preferred embodiment of FIG. 4, the microcontroller 404 is a model PIC16F84 manufactured by MicroChip. The solid state shunt signal switch 412 is a model TLP595G manufactured by Toshiba. The solid state shunt power switch 416 is a model IRFUO24N manufactured by International Rectifier. The solid state relay control switch 454 is a model TLP595G manufactured by Toshiba. The electro-mechanical relay 422 is an MSD 976XAXH-24D manufactured by MagnaCraft, Inc.

It can thus be seen that the applicant has invented an active arc suppression circuit for suppressing arcs across electro-mechanical elements within circuitry. The active arc suppression circuit preferably utilizes one or more solid state switches to temporarily shunt power around the electro-mechanical elements, and in this matter, the active arc suppression circuit can provide relatively economical, reliable, and long lasting electro-mechanical circuitry such as electro-mechanical power relay circuits for example. The active arc suppression circuit can also provide reliable power control for electrical components and equipment, including telecommunications, computing, and related equipment. In addition, the power control may be accomplished remotely and yet reliably through network communication with a power controller including one or more active arc suppression circuits. Multiple active arc suppression circuits and associated power relay circuits may be disposed in one or more housings and, for example, used to remotely and independently control power to multiple electrical components.

The present active arc suppression apparatus, system, and method of use may be used in other environments that include other electro-mechanical components, such as electro-mechanical fuses or fuse switches, that may be subject to arcing. The present arc suppression technique may also be utilized in any environment in which arcing is a problem in closing or powering-on electrical equipment.

It is therefore to be understood that the preceding is a detailed description of preferred embodiments, not all embodiments, of the present invention. The scope of the invention therefore is to be determined by the following claims.

What is claimed is:

1. An active arc suppression circuit of the type for suppressing an arc between mechanical relay contacts, the arc suppression circuit comprising in combination:

A. a power relay having (i) a first relay contact end connectable to one portion of a circuit, (ii) a second relay end connectable to a second portion of said circuit, and (iii) at least one electro-mechanical relay contact element intermediate the first relay contact end and second relay end, the mechanical relay contact element being moveable from a closed relay contact position in electrical communication with the first relay contact end to an open relay contact position distal from the first relay contact end;

B. an active shunt relay connected across said one portion of said circuit and said second portion of said circuit;

C. a power-off signal supply;

D. an active shunt relay timing controller section in communication with the power-off signal supply and said solid state shunt relay; and E. a contact open delay controller section in communication with the power-off signal supply and to said power relay;

whereby the active shunt relay may temporarily shunt current from said one portion of said circuit to said second portion said circuit while the electro-mechanical relay contact element moves from said closed relay contact position toward said open relay contact position.

2. The active arc suppression circuit of claim 1 wherein (i) the power-off signal supply comprises an electrical signal supply connected to an isolator input on a first electrical current isolator, and (ii) the active shunt relay comprises a solid state shunt switch connected to an isolator output on said first electrical current isolator, whereby the solid state shunt switch switches on in response to a power-off signal transmitted from the electrical signal supply through said first electrical current isolator to the solid state shunt switch.

3. The active arc suppression circuit of claim 1 wherein said power relay is an electro-mechanical relay and has an inductive armature drivably connected to the electro-mechanical relay contact clement.

4. The active arc suppression circuit of claim 2 wherein said power relay comprises an electro-mechanical relay and has an inductive armature drivably connected to the electro-mechanical relay contact element.

5. The active arc suppression circuit of claim 1 wherein the contact open delay controller section comprises a delay circuit connected to a solid state delay relay.

6. The active arc suppression circuit of claim 2 wherein the contact open delay controller section comprises a delay circuit connected to a solid state delay relay.

7. The arc suppression circuit of claim 3 wherein the contact open delay controller section comprises a delay circuit connected to a solid state delay relay.

8. The active arc suppression circuit of claim 4 wherein the contact open delay controller section comprises a delay circuit connected to a solid state delay relay.

9. The active arc suppression circuit of claim 5 wherein the solid state delay relay comprises a delay transistor and wherein the contact open delay controller further comprises an electrical current isolator intermediate the delay circuit and the delay transistor.

10. The active arc suppression circuit of claim 6 wherein the solid state delay relay comprises a delay transistor and wherein the contact open delay controller further comprises a second electrical current isolator intermediate the delay circuit and the delay transistor.

11. The active arc suppression circuit of claim 7 wherein the solid state delay relay comprises a delay transistor and wherein the contact open delay controller further comprises an electrical current isolator intermediate the delay circuit and the delay transistor.

12. The arc suppression circuit of claim 8 wherein the solid state delay relay comprises a delay transistor and wherein the contact open delay controller further comprises a second electrical isolator intermediate the delay circuit and the delay transistor.

13. A power controller system of the type controllable by a power control separate from the power controller system, the power controller system comprising in combination:

A. a power controller housing;

B. a network communication client disposed in association with the power controller housing;

C. a power source penetrating the power controller housing;

D. at least one electrical output disposed in the power controller housing; and

E. at least one current shunting arc suppression power switching circuit disposed in the power controller housing and being in communication with the network communication client, said current shunting arc suppression power switching circuit comprising:

(i) a power switch relay disposed in the power controller housing and having mechanical contacts, a power input connection connected to the power source, and a power output connection connected to the one electrical output;

(ii) a solid state shunt relay disposed in the power controller housing intermediate the power input connection of the power source and the one electrical output;

(iii) a shunt relay controller section disposed in the power controller housing in communication with the network communication client and the solid sate shunt relay; and (iv) a power switch delay controller section disposed in the power controller housing in communication with the power signal supply and said power switch relay.

14. The power controller system of claim 13 having a plurality of a plurality of electrical outputs disposed in the power controller housing and a plurality of said current shunting arc suppression power switching circuits disposed in the power controller housing, each among the plurality of electrical outputs being connected to a corresponding one among the plurality of current shunting arc suppression power switching circuits.

15. The power controller system of claim 14 wherein each power switch relay further comprises: (i) a mechanical switching element moveable between said mechanical contacts; and (ii) an induction armature connectable to the mechanical switching element and being in communication with said power switch delay controller.

16. The power controller system of claim 13 further comprising a power controller application connectable to a network and through said network to said network communication client.

17. The power controller system of claim 14 further comprising a power controller application connectable to a network and through said network to said network communication client.

18. The power controller system of claim 15 further comprising a power controller application connectable to a network and through said network to said network communication client.

19. A power controller comprising in combination:

A. a power controller housing;

B. at least one electro-mechanical relay disposed in the power controller housing and having at least one relay contact providing means for switching off electricity between a power source and an electrical load;

C. at least one solid slate shunt switch disposed in the power controller housing and providing solid state shunting means for switchably shunting electricity from the power source to the electrical load, and D. timing controller means for first turning on the solid state shunting means, then opening said relay contact, and then turning off the solid state shunting means.

20. The power controller of claim 19 also including network client means for receiving a power control message over a communications network, said network client means being in communication with said timing controller.

21. The power controller of claim 19 wherein the timing controller is disposed in the power controller housing.

22. The power controller of claim 20 wherein the timing controller and the network client means are disposed in the power controller housing.

23. The power controller of claim 19 including a plurality of said electro-mechanical relays and a plurality of solid state shunting switches, with each said electro-mechanical relay being associated with a corresponding one among the plurality of solid state shunting switches.

24. The power controller of claim 23 further comprising a network client means for independently receiving a power control message for each said electro-mechanical relays and its corresponding solid state shunting switch.

25. The power controller of claim 21 also comprising a plurality of said electro-mechanical relays and a plurality of solid state shunting switches, with each said electro-mechanical relay being associated with a corresponding one among the plurality of solid state shunting switches, and further comprising network client means for independently receiving a power control message for each said electro-mechanical relays and its corresponding solid state shunting switch.

26. The power controller of claim 22 also comprising a plurality of said electro-mechanical relays and a plurality of solid state shunting switches, with each said electro-mechanical relay being associated with a corresponding one among the plurality of solid state shunting switches, and further comprising network client means for independently receiving a power control message for each said electro-mechanical relays and its corresponding solid state shunting switch.

27. The power controller of claim 23 also comprising a plurality of said electro-mechanical relays and a plurality of solid state shunting switches, with each said electro-mechanical relay being associated with a corresponding one among the plurality of solid sate shunting switches, and further comprising network client means for independently receiving a power control message for each said electro-mechanical relays and its corresponding solid state shunting switch.

28. The power controller of claim 23 also including network client means for receiving a power control message over a communication network, said network client means being in communication with said timing controller.

29. The power controller of claim 24 also including network client means for receiving a power control message over a communications network, said network client means being in communication with said timing controller.

30. The power controller of claim 25 also including network client means for receiving a power control message over a communications network, said network client means being in communication with said timing controller.

31. The power controller of claim 26 also including network client means for receiving a power control message over a communications network, said network client means being in communication with said timing controller.

32. An active arc suppression circuit of the type for suppressing an arc across electro-mechanical elements in a circuit, the active arc suppression circuit comprising in combination:

A. an electro-mechanical switch disposed between a current input and a current output within and adjacent one another in a circuit, the electro-mechanical switch having a first electro-mechanical contact connected to the current input and a second electro-mechanical contact connected to the current output;

B. a solid state shunt switch disposed within the circuit and connected to the current input and the current output in said circuit;

C. a shunt timing controller connected to the solid state shunt switch; and

D. a delay timing controller connected to the electro-mechanical switch.

33. The active arc suppression circuit of claim 32 wherein the shunt timing controller provides shunt means for activating the solid state shunt switch to shunt current between the current input and current output for a predetermined period.

34. The active arc suppression circuit of claim 32 wherein the delay timing circuit provides relay means for activating the electro-mechanical switch after the shunt activation means has activated the solid state shunt switch to shunt current between the current input and current output for a predetermined period.

35. The active arc suppression circuit of claim 33 wherein the delay timing circuit provides relay means for activating the electro-mechanical switch after the shunt activation means has activated the solid state shunt switch to shunt current between the current input and current output for a predetermined period.

* * * * *